(12) United States Patent
Sato et al.

(10) Patent No.: US 11,247,785 B2
(45) Date of Patent: Feb. 15, 2022

(54) LIGHTNING CURRENT CONTROLLING DEVICE, LIGHTNING CURRENT CONTROLLING METHOD, AND AIRCRAFT

(71) Applicant: SUBARU CORPORATION, Tokyo (JP)

(72) Inventors: Yasunori Sato, Tokyo (JP); Kei Suzuki, Tokyo (JP); Masato Ogura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 439 days.

(21) Appl. No.: 16/197,110

(22) Filed: Nov. 20, 2018

(65) Prior Publication Data

US 2019/0193867 A1 Jun. 27, 2019

(30) Foreign Application Priority Data

Dec. 21, 2017 (JP) .............................. JP2017-245639

(51) Int. Cl.
*B64D 45/02* (2006.01)

(52) U.S. Cl.
CPC .................................. *B64D 45/02* (2013.01)

(58) Field of Classification Search
CPC ..................................................... B64D 45/02
See application file for complete search history.

(56) References Cited

U.S. PATENT DOCUMENTS

| | | | | |
|---|---|---|---|---|
| 2,497,924 A * | 2/1950 | Beach | .................... | B64D 45/02 361/218 |
| 3,106,663 A * | 10/1963 | Tanner | .................... | B64D 45/02 361/218 |
| 3,906,308 A * | 9/1975 | Amason | ................. | B64D 45/02 361/218 |
| 4,323,946 A * | 4/1982 | Traux | ........................ | H05F 3/00 244/1 A |
| 7,835,130 B2 * | 11/2010 | Ware | ...................... | B64D 37/32 361/218 |
| 10,087,975 B2 * | 10/2018 | Le | .......................... | B64D 45/02 |
| 10,450,086 B2 * | 10/2019 | Martinez-Sanchez | | ..................... B64D 45/02 |
| 10,457,413 B2 * | 10/2019 | Prakash | ................. | G01W 1/16 |
| 10,730,605 B2 * | 8/2020 | Salisbury | ................. | B64C 3/26 |
| 2009/0092844 A1 | 4/2009 | Ware et al. | | |
| 2015/0180371 A1 * | 6/2015 | Becker | ................... | B64D 41/00 244/58 |
| 2015/0195895 A1 | 7/2015 | Huang | | |

(Continued)

FOREIGN PATENT DOCUMENTS

EP 2 886 464 A1 6/2015
EP 3 012 187 A1 4/2016

(Continued)

OTHER PUBLICATIONS

Extended European Search Report issued in corresponding European Patent Application No. 18 20 7240 dated Sep. 6, 2019.

*Primary Examiner* — Joseph W Sanderson
(74) *Attorney, Agent, or Firm* — Troutman Pepper Hamilton Sanders LLP

(57) ABSTRACT

A lightning current controlling method includes adjusting surface roughness of a surface of an aircraft body of an aircraft, a charged amount of the surface of the aircraft body of the aircraft, or both, to cause a passing path of a lightning current to be controlled when the aircraft is struck by lightning.

17 Claims, 8 Drawing Sheets

(56) References Cited

U.S. PATENT DOCUMENTS

| | | | |
|---|---|---|---|
| 2016/0114883 A1* | 4/2016 | Guerry | B81B 7/02 |
| | | | 244/200 |
| 2017/0313438 A1* | 11/2017 | Martinez-Sanchez | ......... |
| | | | G01R 29/0842 |
| 2017/0314606 A1* | 11/2017 | Le | F16B 35/041 |
| 2017/0327245 A1* | 11/2017 | Salisbury | B64C 3/26 |
| 2019/0031368 A1* | 1/2019 | Prakash | B64D 45/02 |
| 2019/0135449 A1* | 5/2019 | Peres | H01T 19/02 |
| 2019/0329872 A1* | 10/2019 | Guerry | B64D 15/00 |
| 2021/0047049 A1* | 2/2021 | Bolton | B64D 45/02 |

FOREIGN PATENT DOCUMENTS

| | | |
|---|---|---|
| EP | 3 243 742 A1 | 11/2017 |
| EP | 3 434 599 A1 | 1/2019 |
| JP | H06-333431 A | 12/1994 |
| JP | 2014-058311 A | 4/2014 |

* cited by examiner

LIGHTNING CURRENT CONTROLLING DEVICE, LIGHTNING CURRENT CONTROLLING METHOD, AND AIRCRAFT

CROSS-REFERENCE TO RELATED APPLICATIONS

The present application claims priority from Japanese Patent Application No. 2017-245639 filed on Dec. 21, 2017, the entire contents of which are hereby incorporated by reference.

BACKGROUND

The technology relates to a lightning current controlling device, a lightning current controlling method, and an aircraft.

A lightning strike to an aircraft makes a lightning current flow through the structure of the aircraft. The lightning current flows in from an entrance at a position where the lightning has struck and discharges from an exit. The lightning current can be a cause of damage. From this point of view, an aircraft that has been struck by lightning is inspected to determine the entrance, the passing path, and the exit of the lightning current. After the passing path including the entrance and the exit of the lightning current is determined, inspection for damage and necessary repairing are performed along the passing path of the lightning current. Meanwhile, a technique has been developed of forming a passing path of a lightning current of lightning that has struck an aircraft, to prevent the lightning current from flowing through an important part of the aircraft.

SUMMARY

An aspect of the technology provides a lightning current controlling method including adjusting surface roughness of a surface of an aircraft body of an aircraft, a charged amount of the surface of the aircraft body of the aircraft, or both, to cause a passing path of a lightning current to be controlled when the aircraft is struck by lightning.

An aspect of the technology provides a lightning current controlling device that includes a first charged part and a second charged part. The first charged part is configured to be provided to an aircraft and to be positively charged to have a higher probability of being a location struck by negative lightning. The second charged part is configured to be provided to the aircraft and to be negatively charged to have a higher probability of being a location struck by positive lightning.

An aspect of the technology provides an aircraft including a lightning current controlling device that includes a first charged part and a second charged part. The first charged part is configured to be provided to an aircraft and to be positively charged to have a higher probability of being a location struck by negative lightning. The second charged part is configured to be provided to the aircraft and to be negatively charged to have a higher probability of being a location struck by positive lightning.

An aspect of the technology provides an aircraft having surface roughness of a surface of its aircraft body that is adjusted to cause a passing path of a lightning current to be controlled when the aircraft is struck by lightning, a charged amount of the surface of the aircraft body that is adjusted to cause the passing path of the lightning current to be controlled when the aircraft is struck by lightning, or both.

DETAILED DESCRIPTION

Figure 1:
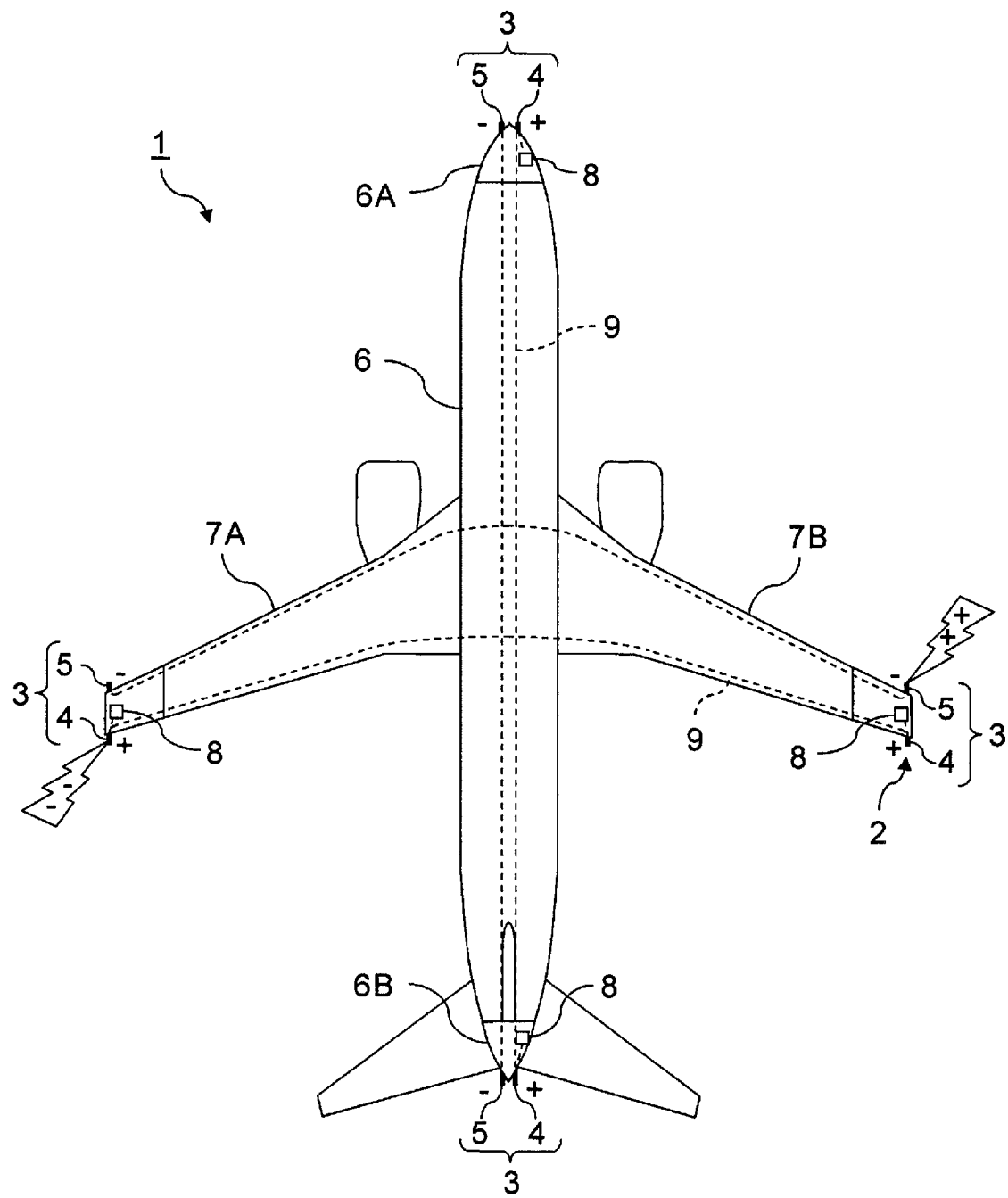
FIG. 1 is a top view of an example of an aircraft equipped with a lightning current controlling device according to an implementation of the technology.

A lightning current controlling device, a lightning current controlling method, and an aircraft according to an implementation of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example implementations which are not recited in a most-generic independent claim of the disclosure are optional and may be provided on an as-needed basis. Throughout the present specification and the drawings, elements having substantially the same function and configuration are denoted with the same numerals to avoid any redundant description.

A lightning strike to an aircraft can damage multiple portions of the aircraft due to a lightning current. This may require a great amount of time and labor in determination of a passing path of the lightning current and in determination and repairing of damaged portions.

It is desirable to provide a lightning controlling device, a lighting controlling method, and an aircraft that enable a decrease in labor required for an aircraft that has been struck by lightning.

First Implementation

Configuration and Example Workings

Figure 2:
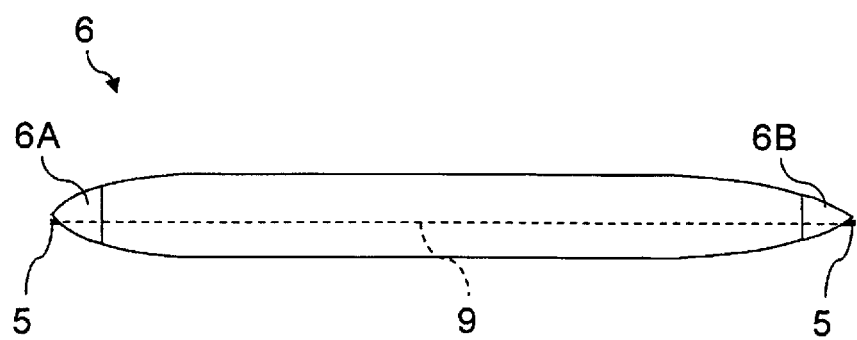
FIG. 2 is a front view of an example a fuselage of the aircraft illustrated in FIG. 1.

FIG. 1 is a top view of an aircraft (an aircraft 1) equipped with a lightning current controlling device according to a first implementation of the technology. FIG. 2 is a front view of a fuselage of the aircraft illustrated in FIG. 1.

The aircraft 1 may be equipped with a lightning current controlling device 2. Conversely, the lightning current controlling device 2 may be provided to the aircraft 1. Although FIGS. 1 and 2 illustrate an example of a fixed-wing aircraft as the aircraft 1, the aircraft 1 may be a rotary-wing aircraft, an airship, or other types of aircrafts. The lightning current controlling device 2 may control a passing path including an entrance and an exit of a lightning current that is generated when the aircraft 1 is struck by lightning.

The lightning current controlling device 2 may include one or more lightning stroke controllers 3. The lightning stroke controller 3 may have a charged amount that is so adjusted that the lightning stroke controller 3 has a probability of being struck by lightning higher than that of other part. For example, the lightning stroke controller 3 may include a first charged part 4 and a second charged part 5. The first charged part 4 may be configured to be positively charged. Thus, the first charged part 4 may include a dielectric that is positively charged more easily. In contrast, the second charged part 5 may be configured to be negatively charged. Thus, the second charged part 5 may include a dielectric that is negatively charged more easily.

Lightning includes four types of lightning: downward positive lightning, downward negative lightning, upward positive lightning, and upward negative lightning. The downward lightning occurs by movement of electric charges from a thundercloud to a ground surface. Conversely, the upward lightning occurs by movement of electric charges from a ground surface to a thundercloud. The positive lightning occurs by movement of positive ions, etc. having positive electric charges, whereas the negative lightning occurs by movement of electrons, negative ions, etc. having negative electric charges. Typical lightning that propagates from a thundercloud to a ground surface or vice versa is called "cloud-to-ground lightning". In addition, there is lightning called a "cloud discharge". The cloud discharge includes two types of discharges, that are, an intra-cloud discharge and a cloud-to-cloud discharge. The intra-cloud discharge occurs within one cloud, whereas the cloud-to-cloud discharge occurs between different clouds. It is known that the polarity and the direction of electric charges of lightning vary depending on weather conditions.

The first charged part 4 may include a dielectric and be configured to be positively charged to cause an increase in a probability of being struck by negative lightning. Conversely, the second charged part 5 may include a dielectric and be configured to be negatively charged to cause an increase in a probability of being struck by positive lightning. In view of these, the first charged part 4 and the second charged part 5 may each be provided to the aircraft 1 in an air-exposed state. This enables, regardless of whether the lightning is positive or negative, an increase in a probability that the lightning stroke controller 3 is struck by the lightning, compared with that of a structural body around the lightning stroke controller 3, because the lightning stroke controller 3 includes the first charged part 4 and the second charged part 5.

Meanwhile, it is known that lightning tends to strike a part with a sharp shape regardless of the charged amount. In the case of the aircraft 1 being a fixed-wing aircraft, a probability of being a lightning stroke point, that is, a probability of being an entrance of lightning current, may be higher at a leading end 6A of the fuselage 6, a wingtip of a left main wing 7A, a wingtip of a right main wing 7B, and a trailing end 6B of the fuselage 6. From this point of view, the lightning current controlling device 2 may include multiple lightning stroke controllers 3. Each of the lightning stroke controllers 3 may be disposed at each part with a higher probability of being struck by lightning. This further increases the probability that the lightning stroke controller 3 is struck by lightning.

In the example illustrated in FIG. 1, the lightning current controlling device 2 may include four lightning stroke controllers 3. Each of the four lightning stroke controllers 3 includes the first charged part 4 and the second charged part 5. The lightning stroke controllers 3 may be provided to the leading end 6A of the fuselage 6, the trailing end 6B of the fuselage 6, and the wingtip of the left main wing 7A and the right main wing 7B. This increases a probability that any one of the lightning stroke controllers 3 is struck by lightning. It goes without saying that the lightning stroke controller 3 may also be provided to another part with a higher probability of being struck by lightning, such as a tail assembly.

In one example, each of the first charged part 4 and the second charged part 5 may include a projection. In this case, the probability of being a lightning stroke point may be increased. For example, each of the first charged part 4 and the second charged part 5 may have a rod shape. This shape further increases a probability that any of the first charged parts 4 and the second charged parts 5 is struck by lightning. That is, providing a suitable shape and a suitable charged amount enables control of forming the lightning stroke point.

Each of the first charged part 4 and the second charged part 5 has a higher probability of being a lightning stroke point, and thus, also has a higher probability of being damaged by a lightning current with high voltage. In view of this, in one example, the first charged part 4 and the second charged part 5 may be made to be easier to replace. In a practical example, each of the first charged part 4 and the second charged part 5 may be more easily detachable by providing each of the first charged part 4 and the second charged part 5 with a structure attachable by means of a screw, a fastener, etc. In one example of a particularly easy structure, each of the first charged part 4 and the second charged part 5 may have a rod shape with an externally threaded end, and each of these externally threaded ends may be fastened to a female screw provided to the aircraft 1.

The first charged part 4 may be positively charged by an electrostatic generator 8. On the other hand, the second charged part 5 may be negatively charged by the electrostatic generator 8 or by friction with the air. In the condition in which the second charged part 5 includes a material that is easy to negatively charge as much as possible in a charging series, the second charged part 5 may be negatively charged by friction with the air without using the electrostatic generator 8. Since the air is a substance that is positively charged by friction highly easily, it may be reasonable that the first charged part 4 is positively charged by the electrostatic generator 8.

In view of this, the lightning current controlling device 2 may include the electrostatic generator 8 that positively charges the first charged part 4. The electrostatic generator 8 may also be used to negatively charge the second charged part 5. The electrostatic generator 8 may be shared by the lightning stroke controllers 3 or may be provided for each of the multiple lightning stroke controllers 3. Non-limiting examples of the electrostatic generator 8 may include a Van de Graaff generator, an electrostatic generator available from SAMES, and an electrohydrodynamics (EHD) generator.

Among materials that are easy to negatively charge, polytetrafluoroethylene and acrylic resin may be used as coating agent, paint, or a material for other purpose, in the aircraft 1. In view of this, the second charged part 5 may include polytetrafluoroethylene, acrylic resin, or both to produce the second charged part 5 by using an existing material that is already also used in the aircraft 1.

On the other hand, in one example, the first charged part 4 that is to be positively charged by the electrostatic generator 8 may include a material that is easy to positively charge, in order to avoid a decrease in a charged amount due to friction with the air. Among materials that are easy to positively charge in the charging series, polyamide resin and rayon may be used in the aircraft 1. In view of this, the first charged part 4 may include polyamide resin, rayon, or both.

The first charged part 4 or the second charged part 5 that is struck by lightning may serve as an exit or an entrance of a lightning current. That is, a lightning current may flow in a direction corresponding to the polarity of the lightning stroke. For example, the first charged part 4 that is positively charged may be struck by negative lightning. As a result, the first charged part 4 may serve as an entrance for flow of negative electric charges composed of electrons, that is, may serve as an exit for a lightning current. In contrast, the second charged part 5 that is negatively charged may be struck by positive lightning. As a result, the second charged part 5 may serve as an exit for flow of negative electric charges composed of electrons, that is, may serve as an entrance for a lightning current.

A lightning current can be a cause of damage or malfunction of each part included in the aircraft 1. Thus, limiting a passing path of the lightning current enables decreasing generation of damage or malfunction. In view of this, to form a current path through which the lightning current flows, a conductor 9, such as a metal wire, may be coupled to each of the first charged part 4 and the second charged part 5. Under these conditions, the entrance of the flow of the lightning current generated by lightning that has struck the first charged part 4 may be made on the other end side of the conductor 9. Similarly, the exit of the flow of the lightning current generated by lightning that has struck the second charged part 5 may be made on the other end side of the conductor 9.

In another example, in the case of using the multiple lightning stroke controllers 3, the first charged parts 4 that are positively charged may be electrically coupled with each other by the conductor 9, and the second charged parts 5 that are negatively charged may also be electrically coupled with each other by another conductor 9. In this condition, in a case where negative lightning strikes the first charged part 4, and the first charged part 4 serves as an exit for a lightning current, the other first charged part 4 may serve as an entrance for the lightning current. As a result, discharging occurs to the air from the first charged part 4 that serves as the entrance for the lightning current. On the other hand, in a case where positive lightning strikes the second charged part 5, and the second charged part 5 serves as an entrance for a lightning current, the other second charged part 5 may serve as an exit for the lightning current. As a result, discharging occurs to the air from the second charged part 5 that serves as the exit for the lightning current.

In the example illustrated in FIGS. 1 and 2, the first charged part 4 provided to the leading end 6A of the fuselage 6 and the first charged part 4 of the trailing end 6B of the fuselage 6 may be mutually coupled by the conductors 9. Further, the second charged part 5 provided to the leading end 6A of the fuselage 6 and the second charged part 5 of the trailing end 6B of the fuselage 6 may be mutually coupled by the conductors 9. Further, the first charged part 4 provided at the wingtip of the left main wing 7A and the first charged part 4 provided at the wing tip of the right main wing 7B may be mutually coupled by the conductors 9. Further, the second charged part 5 provided to the wingtip of the left main wing 7A and the second charged part 5 provided to the wingtip of the right main wing 7B may be mutually coupled by the conductors 9.

Under this configuration, a passing path including an entrance and an exit of the lightning current is limited to any of the conductor 9 that mutually connects the two first charged parts 4 and the conductor 9 that mutually connects the two second charged parts 5. In another example, three or more first charged parts 4 may be mutually coupled by the conductor 9 to disperse the flow of a lightning current. Further, three or more second charged parts 5 may be mutually coupled by the conductor 9 to disperse the flow of a lightning current. In this case, also, the passing path of the lightning current is limited to any of the conductor 9 that mutually connects the multiple first charged parts 4 and the conductor 9 that mutually connects the multiple second charged parts 5.

This sufficiently decreases a probability that the lightning current flows into the vicinity of a fuel tank, a cabin, electronic equipment, or any other part that should be avoided. It may be important to electrically insulate between the first charged part 4 and a part excluding the conductor 9 and between the second charged part 5 and the part excluding the conductor 9, from a point of view of prevention of leakage of a lightning current. Additionally, disposing the conductor 9 as straight as possible with least curve also prevents a lightning current from leaking. Thus, determining the first charged part 4 and the second charged part 5 to be coupled by the conductor 9 as illustrated in FIGS. 1 and 2 allows the conductors 9 to be disposed substantially straightly, thereby decreasing leakage risk of a lightning current.

According to the lightning current controlling device 2, the lightning current controlling method, and the aircraft 1 of this implementation, a polarity of electric charges and a charged amount are adjusted to limit a part to be struck by lightning, and the conductor 9 is disposed to limit a passing path of a lightning current.

Example Effects

The lightning current controlling device 2, the lightning current controlling method, and the aircraft 1 of this implementation make a work for determining a passing path of a lightning current and a lightning stroke position easier than that using an existing technique. This results in making labor required to inspect and repair damage by a lightning strike less than before.

That is, a part to be struck by lightning more easily to strike is limited to either one of the first charged part 4 and the second charged part 5. Moreover, a passing path of a lightning current is limited to the conductor 9 that mutually connects the first charged parts 4 and to the conductor 9 that mutually connects the second charged parts 5. This results in preventing a lightning current from flowing into a part that should be avoided and also results in limiting a part that will be damaged by the inflow of the lightning current. Thus, while generation of damage to a part in the vicinity of a fuel tank or other parts by the inflow of a lightning current and occurrence of malfunction due to generated spark are prevented, inspection of damage that may be generated due to the flow of the lightning current and detection of a damaged position are performed more easily. Accordingly, for example, maintenance time or repairment cost caused by a lightning strike are reduced.

Second Implementation

Figure 3:
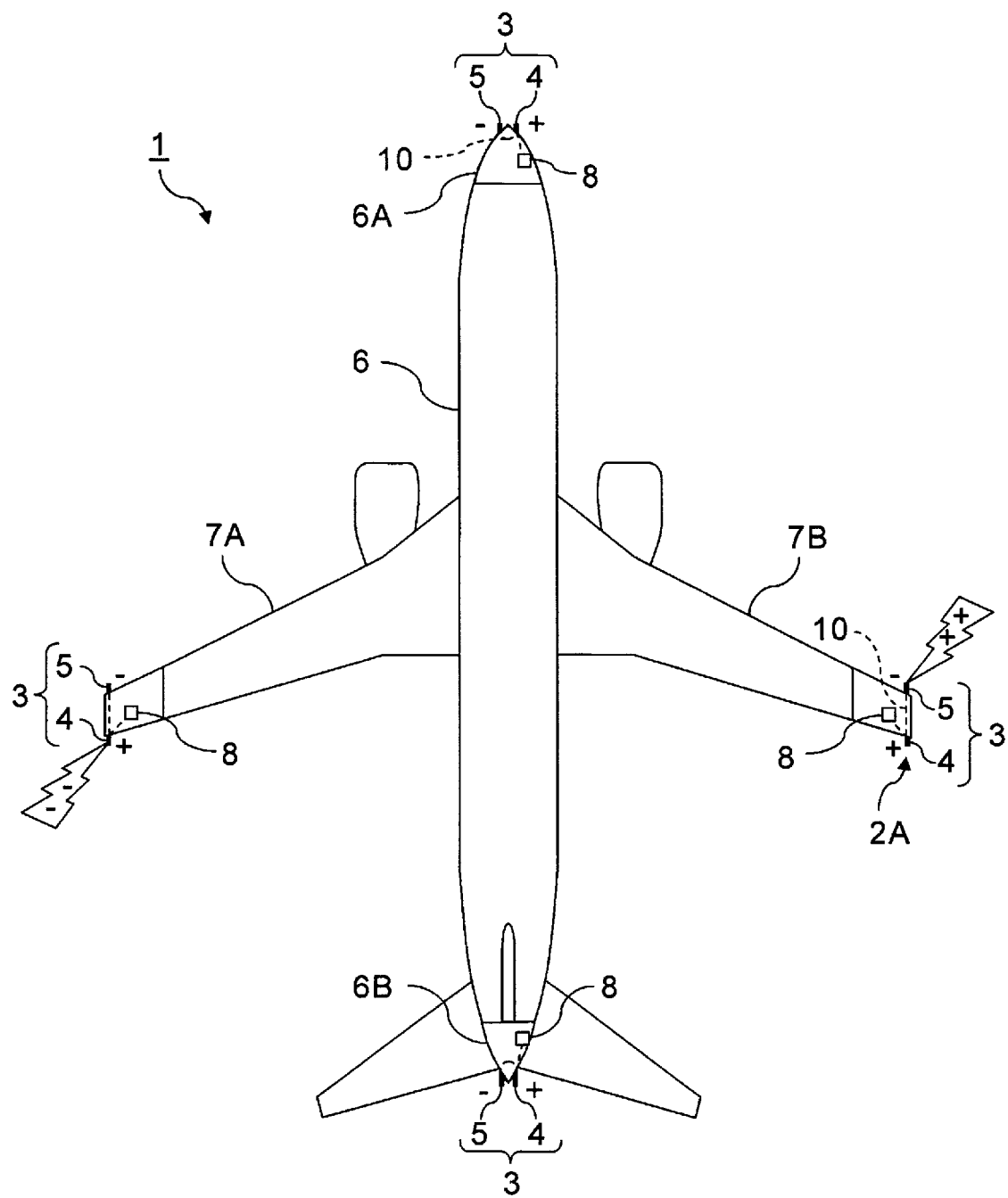
FIG. 3 is a top view of an example of an aircraft equipped with a lightning current controlling device according to an implementation of the technology.

FIG. 3 is a top view of an aircraft equipped with a lightning current controlling device according to a second implementation of the technology.

FIG. 3 illustrates a lightning current controlling device 2A of the second implementation. The lightning current controlling device 2A differs from the lightning current controlling device 2 of the first implementation in that the first charged part 4 and the second charged part 5 are coupled by a current path 10. The other components and workings of the lightning current controlling device 2A of the second implementation do not substantially differ from those of the lightning current controlling device 2 of the first implementation, and therefore, the same components and the corresponding components are represented by the same reference signs, and descriptions thereof are not repeated.

As illustrated in FIG. 3, the first charged part 4 and the second charged part 5 may be coupled by the current path 10. The current path 10 may include a circuit that maintains a potential difference between the first charged part 4 and the second charged part 5 and that allows a lightning current generated by lightning that has struck either one of the first charged part 4 and the second charged part 5 to flow into the current path 10.

This structure increases a probability that lightning strikes the lightning stroke controller 3 because the first charged part 4 has a higher probability of being struck by negative lightning and the second charged part 5 has a higher probability of being struck by positive lightning. In a case where negative lightning strikes the first charged part 4, and the first charged part 4 becomes an exit of a lightning current, the second charged part 5, which is coupled to the first charged part 4 by the current path 10, serves as an entrance of the lightning current. Similarly, in a case where positive lightning strikes the second charged part 5, and the second charged part 5 becomes an entrance of a lightning current, the first charged part 4, which is coupled to the second charged part 5 by the current path 10, serves as an exit of the lightning current. Thus, a passing path including an entrance and an exit of the lightning current is limited, thereby enabling easier inspection and repairing of damage.

For example, as illustrated in FIG. 3, coupling a pair of the first charged part 4 and the second charged part 5 included in the lightning stroke controller 3, by the current path 10, makes the length of a passing path of a lightning current shorter. That is, an entrance and an exit of the lightning current may be generated in a local region such as the leading end 6A of the fuselage 6, the wingtip of the left main wing 7A, the wingtip of the right main wing 7B, and the trailing end 6B of the fuselage 6, thereby decreasing a probability that a lightning current flows into the other parts of the aircraft 1.

The first charged part 4 of one of the multiple lightning stroke controllers 3, which are provided to different positions of the aircraft 1, and the second charged part 5 of another one of the lightning stroke controllers 3 may be coupled by the current path 10. In this case, it may be easier to dispose the current path 10 as straight as possible. In general, a lightning current tends to flow straightly. For this reasons, although a pair of the first charged part 4 and the second charged part 5 included in the lightning stroke controller 3 are coupled by the current path 10 as illustrated in FIG. 3 to generate an entrance and an exit of a lightning current in the local region, there is a possibility that the lightning current flows into other part.

In view of this, for example, the first charged part 4 provided to the leading end 6A of the fuselage 6 and the second charged part 5 provided to the trailing end 6B of the fuselage 6 may be coupled by the current path 10, whereas the second charged part 5 provided to the leading end 6A of the fuselage 6 and the first charged part 4 provided to the trailing end 6B of the fuselage 6 may be coupled by the current path 10. Meanwhile, the first charged part 4 provided to the wingtip of the left main wing 7A and the second charged part 5 provided to the wingtip of the right main wing 7B may be coupled by the current path 10, whereas the second charged part 5 provided to the wingtip of the left main wing 7A and the first charged part 4 provided to the wingtip of the right main wing 7B may be coupled by the current path 10. This structure forms a passing path into which a lightning current flows more easily, thereby increasing a probability that the lightning current flows into the current path 10.

Figure 4:
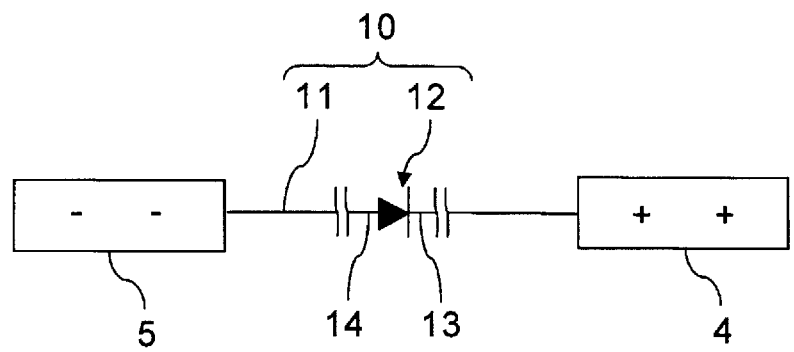
FIG. 4 is a diagram illustrating a first example of a configuration of a current path illustrated in FIG. 3.

FIG. 4 illustrates a first example of a configuration of the current path 10 illustrated in FIG. 3.

As illustrated in FIG. 4, a diode 12 may be coupled between conducting wires 11 that couples the first charged part 4 and the second charged part 5 to form the current path 10. For example, a cathode 13 of the diode 12 may be coupled to the conducting wire 11 on the side of the first charged part 4, which is positively charged, whereas an anode 14 of the diode 12 may be coupled to the conducting wire 11 on the side of the second charged part 5, which is negatively charged.

This configuration prevents a decrease in a charged amount of each of the first charged part 4 and the second charged part 5 as a result of a flow of negative electric charges from the first charged part 4 to the second charged part 5. That is, the charged condition of each of the first charged part 4 and the second charged part 5 is maintained.

In this case, a breakdown voltage of the diode 12 may be set lower than a lightning voltage. This allows a lightning current to flow through the diode 12 in either one of a forward direction and a backward direction. Thus, the passing path of the lightning current is limited to the current path 10.

Figure 5:
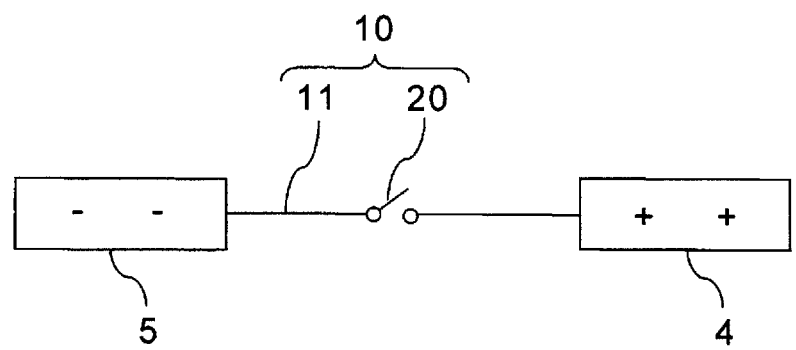
FIG. 5 is a diagram illustrating a second example of the configuration of the current path illustrated in FIG. 3.

FIG. 5 illustrates a second example of the configuration of the current path 10 illustrated in FIG. 3.

As illustrated in FIG. 5, a switch 20 may be coupled between the conducting wires 11 that couple the first charged part 4 and the second charged part 5 to form the current path 10. The switch 20 may close when a lightning current flows therein and thereby couples the conducting wires 11. The switch 20 may include a conductor that generates heat and deforms when a lightning current flows therein, thereby connecting its contact points mutually. Non-limiting examples of the conductor may include a shape-memory alloy. Such a current path 10 also allows a lightning current to flow from one to the other when lightning strikes either one of the first charged part 4 and the second charged part 5 while maintaining the charged conditions of the first charged part 4 and the second charged part 5.

Figure 6:
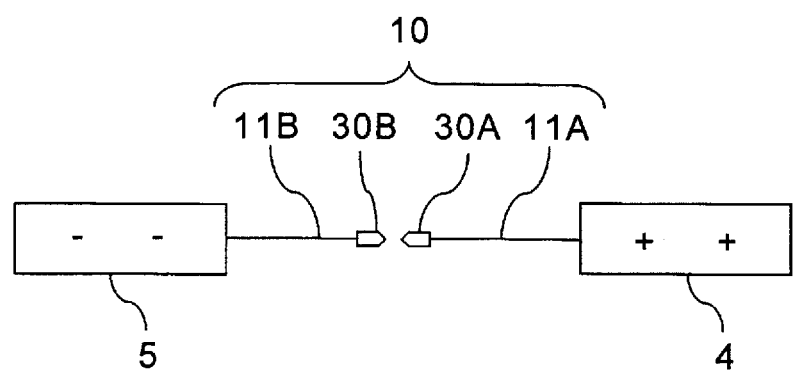
FIG. 6 is a diagram illustrating a third example of the configuration of the current path illustrated in FIG. 3.

FIG. 6 illustrates a third example of the configuration of the current path 10 illustrated in FIG. 3.

As illustrated in FIG. 6, it is also possible to form the current path 10 by disposing an end 30A of a first conducting wire 11A and an end 30B of a second conducting wire 11B in a separated manner. The end 30A of the first conducting wire 11A may be coupled to the first charged part 4. The end 30B of the second conducting wire 11B may be coupled to the second charged part 5. The end 30A of the first conducting wire 11A and the end 30B of the second conducting wire 11B have air therebetween, and the air serves as an insulator, thereby inhibiting electric charges from transferring.

In this condition, in a case where a voltage that exceeds a breakdown voltage corresponding to a distance between the end 30A of the first conducting wire 11A and the end 30B of the second conducting wire 11B is applied between the end 30A of the first conducting wire 11A and the end 30B of the second conducting wire 11B, dielectric breakdown occurs, and an electric current flows. Thus, it is possible to form the current path 10 that allows a lightning current to flow therethrough while inhibiting transfer of electric charges, by adjusting the distance between the end 30A of the first conducting wire 11A and the end 30B of the second conducting wire 11B.

In one example, the end 30A of the first conducting wire 11A and the end 30B of the second conducting wire 11B may have a sharp shape and be disposed opposite to each other as illustrated in FIG. 6 in order to stabilize a passing path of plasma that is generated by dielectric breakdown of the air. In other words, a sharp-shaped terminal may be used to provide each of the end 30A of the first conducting wire 11A and the end 30B of the second conducting wire 11B.

In another example, the current path 10 may include an insulative rope that allows a lightning current to flow by dielectric breakdown while inhibiting transfer of electric charges between the first charged part 4 and the second charged part 5. In this example, the current path 10 may need to include an insulator whose breakdown voltage for dielectric breakdown is lower than those of the surroundings, to prevent leakage of a lightning current to the outside of the current path 10. It goes without saying that it is also possible to form the current path 10 that allows a lightning current to flow therethrough while inhibiting transfer of electric charges in accordance with any other principle.

The lightning current controlling device 2A of the second implementation may have the first charged part 4 and the second charged part 5 that are coupled by the current path 10 that allows only a lightning current to flow therethrough while inhibiting transfer of electric charges. In the first implementation, the potential difference between the first charged part 4 and the second charged part 5 is maintained by using the conductor 9 to couple the dielectrics that are charged with electricity having the same polarity. In contrast, in the second implementation, the potential difference between the first charged part 4 and the second charged part 5 is maintained by using the current path 10, which allows a lightning current to flow therethrough while inhibiting transfer of electric charges, to couple the dielectrics that are charged with electricity having different polarities.

Thus, the second implementation provides effects similar to those obtained by the first implementation and also provides an effect in which a passing path of a lightning current is limited within the lightning stroke controller 3. That is, the second implementation enables increasing a probability that an entrance or an exit of a lightning current is generated close to an exit or an entrance of the lightning current. This results in reduction in risk of damage to an important part of the aircraft 1 due to the lightning current and in labor required for work accompanying inspection and repairing to cope with the aircraft 1 that has been struck by lightning.

In addition, the first implementation and the second implementation may be achieved in combination. That is, while multiple first charged parts 4 that are charged with electricity having the same polarity may be mutually coupled by the conductor 9 and multiple second charged parts 5 that are charged with electricity having the same polarity may be mutually coupled by the conductor 9, the first charged part 4 and the second charged part 5, which are charged with electricity having different polarities, may be coupled by the current path 10 that allows a lightning current to flow therethrough while inhibiting transfer of electric charges. This case provides a higher degree of freedom of forming a passing path of a lightning current. In this case, multiple passing paths through which a lightning current flows more easily are coupled to either one of the first charged part 4 and the second charged part 5. This increases a probability that a lightning current flows through the conductor 9 or the current path 10.

Third Implementation

Figure 7:
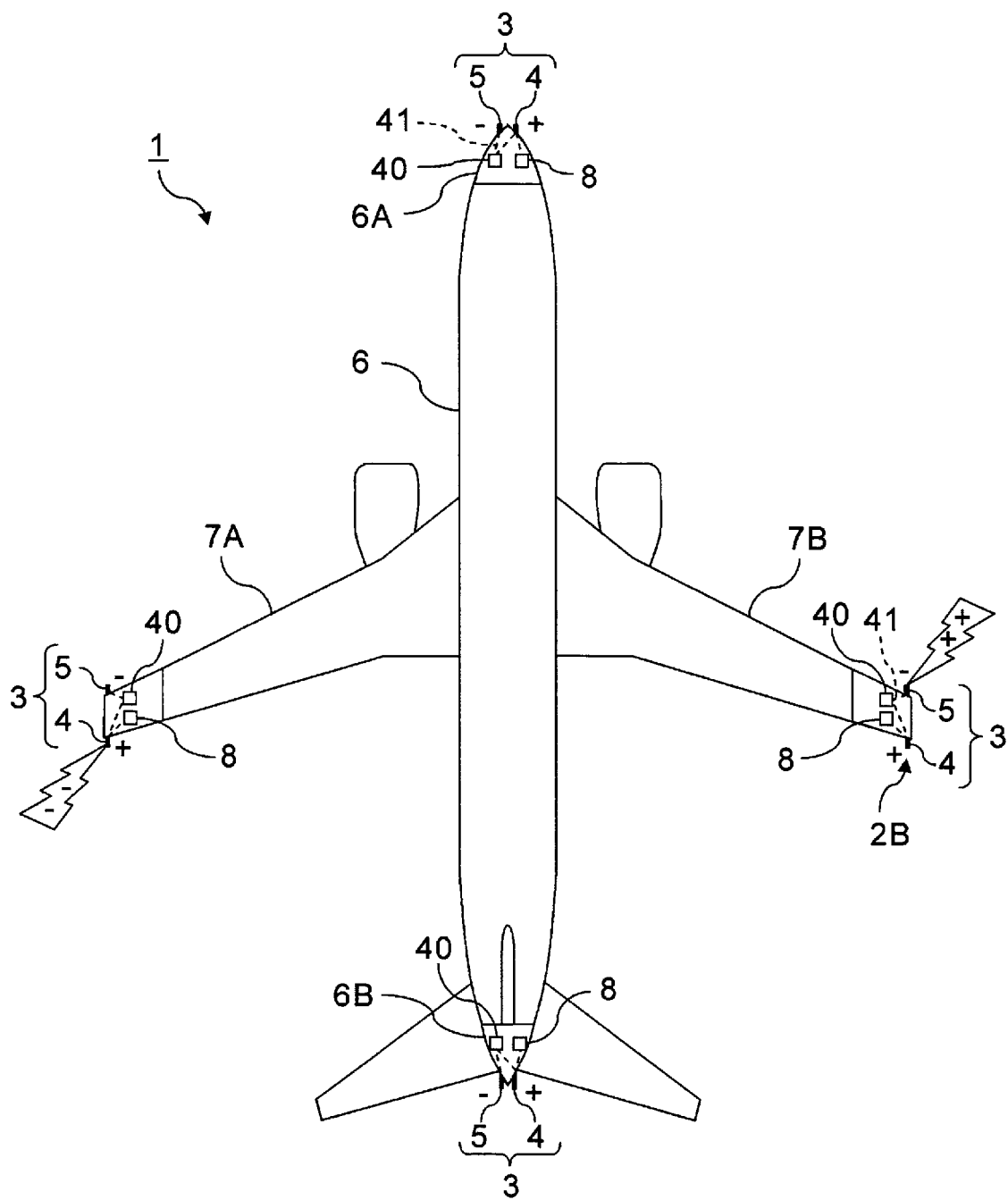
FIG. 7 is a top view of an example of an aircraft equipped with a lightning current controlling device according to an implementation of the technology.

FIG. 7 is a top view of an aircraft equipped with a lightning current controlling device according to a third implementation of the technology.

FIG. 7 illustrates a lightning current controlling device 2B of the third implementation. The lightning current controlling device 2B differs from the lightning current controlling device 2 of the first implementation and the lightning current controlling device 2A of the second implementation as described below. That is, the lightning current controlling device 2B may include a thermal converter 40 that prevents a lightning current from flowing by converting energy of the lightning current into thermal energy. The other components and workings of the lightning current controlling device 2B of the third implementation do not substantially differ from those of the lightning current controlling device 2 of the first implementation and the lightning current controlling device 2A of the second implementation, and therefore, the same components and the corresponding components are represented by the same reference signs, and descriptions thereof are not repeated.

The thermal converter 40 may include a metal part or other material that is fused by Joule's heat when a large current such as a lightning current flows therethrough on the basis of a principle similar to that for a fuse. The thermal converter 40 may have a conductor 41 that is coupled to both of the first charged part 4 and the second charged part 5. In a case where electrons flow by lightning that has struck the first charged part 4 or the second charged part 5, the thermal converter 40 may convert, with the conductor 41, the energy of the electrons into thermal energy because the thermal converter 40 has a sufficiently high resistance value. As a result, the lightning current, that is, the electrons are inhibited or prevented from flowing by the thermal converter 40. This prevents discharging of electricity to the air, generation of plasma, etc. Even when electricity is discharged or plasma is generated, the occurrence amount is reduced.

In the third implementation, in a case where either one of the first charged part 4 and the second charged part 5 is struck by lightning, the energy of a lightning current is consumed by the thermal converter 40. This decreases a probability that a lightning current flows into other parts of the aircraft 1. This results in reduction in risk of damage to an important part of the aircraft 1 due to the lightning current and in labor required for work accompanying inspection and repairing to cope with the aircraft 1 that has been struck by lightning.

It goes without saying that, while the thermal converter 40 may be coupled to both of the first charged part 4 and the second charged part 5, the first charged parts 4 may be mutually coupled by the conductor 9 as in the first implementation, the second charged parts 5 may be mutually coupled by the conductor 9 as in the first implementation, or the first charged part 4 and the second charged part 5 may be coupled by the current path 10 as in the second implementation, or both of the conductor 9 and the current path 10 may be used. That is, the third implementation may be combined with the first implementation, the second implementation, or both. Such a case enables increasing controllability of a passing path of a lightning current that tends to flow a passing path that is determined depending on weather conditions, etc. Thus, the probability that a lightning current flows into a part that should be avoided is further decreased.

Fourth Implementation

Figure 8:
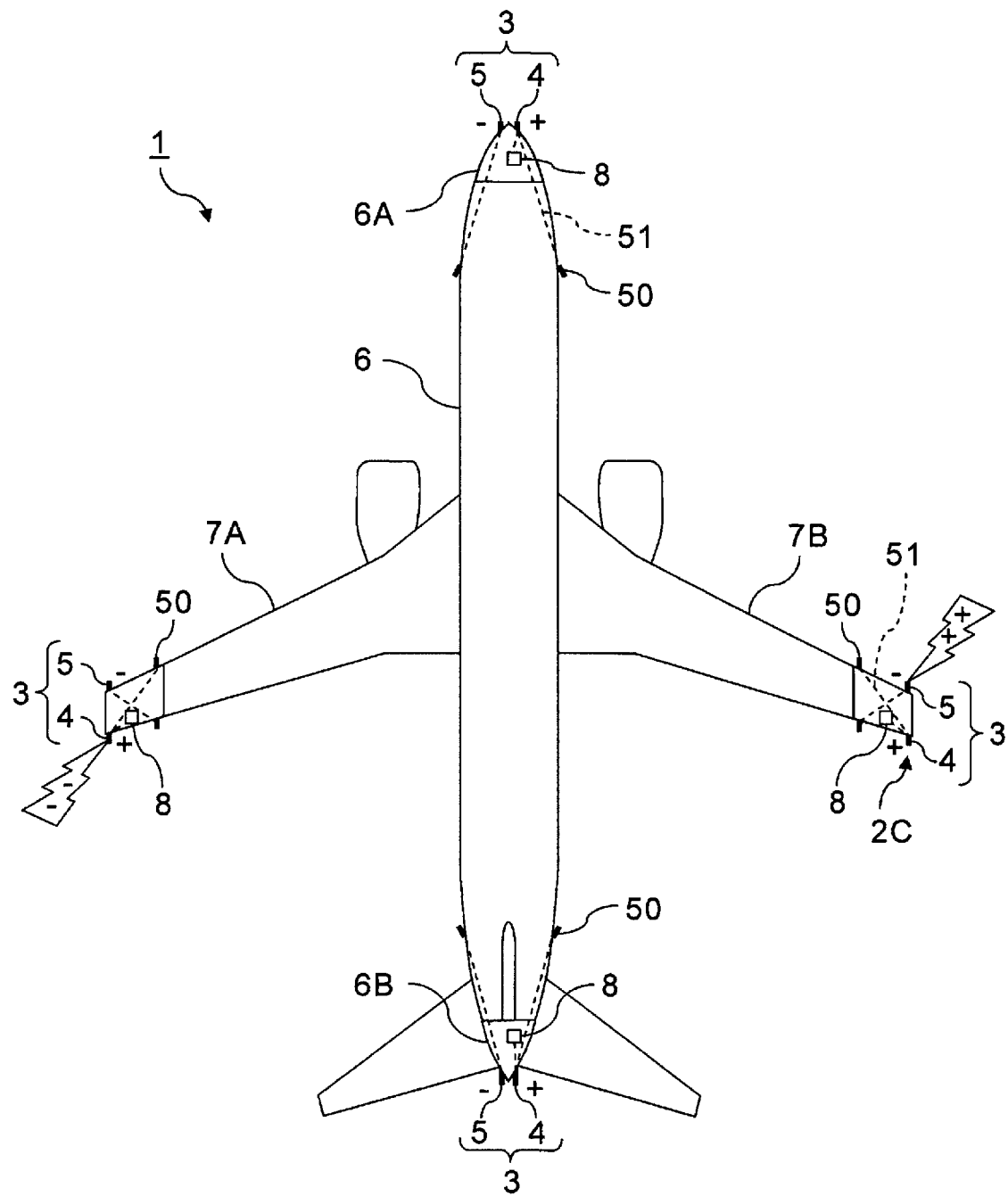
FIG. 8 is a top view of an example of an aircraft equipped with a lightning current controlling device according to an implementation of the technology.

FIG. 8 is a top view of an aircraft equipped with a lightning current controlling device according to a fourth implementation of the technology.

FIG. 8 illustrates a lightning current controlling device 2C of the fourth implementation. The lightning current controlling device 2C differs from the lightning current controlling device 2 of the first implementation and the lightning current controlling device 2A of the second implementation as described below. That is, the lightning current controlling device 2C may include a protrusion 50 that serve as either one of an entrance and an exit of a lightning current, which is generated by lightning that has struck either one of the first charged part 4 and the second charged part 5. The other components and workings of the lightning current controlling device 2C of the fourth implementation do not substantially differ from those of the lightning current controlling device 2 of the first implementation and the lightning current controlling device 2A of the second implementation, and therefore, the same components and the corresponding components are represented by the same reference signs, and descriptions thereof are not repeated.

The protrusion 50 may have a sharp shape and may be coupled to the first charged part 4 via a conductor 51. In this condition, in a case where a lightning current flows in the conductor 51 by lightning that has struck the first charged part 4, the protrusion 50 may serve as either one of an entrance and an exit of the lightning current. Alternatively, or additionally, the protrusion 50 with the sharp shape may be coupled to the second charged part 5 via the conductor 51. In this condition, in a case where a lightning current flows in the conductor 51 by lightning that has struck the second charged part 5, the protrusion 50 may serve as either one of an entrance and an exit of the lightning current. Thus, the probability that a lightning current flows into a part that should be avoided is decreased. The protrusion 50 may have a higher probability that a lightning current flows therein. Therefore, in one example, the protrusion 50 may be detachable by a screw, etc. and replaceable in a similar manner as in the case of the first charged part 4 and the second charged part 5.

It goes without saying that the fourth implementation may be combined with one or more of other implementations of the technology in order to further prevent a lightning current from flowing into a part that should be avoided.

Fifth Implementation

Figure 9:
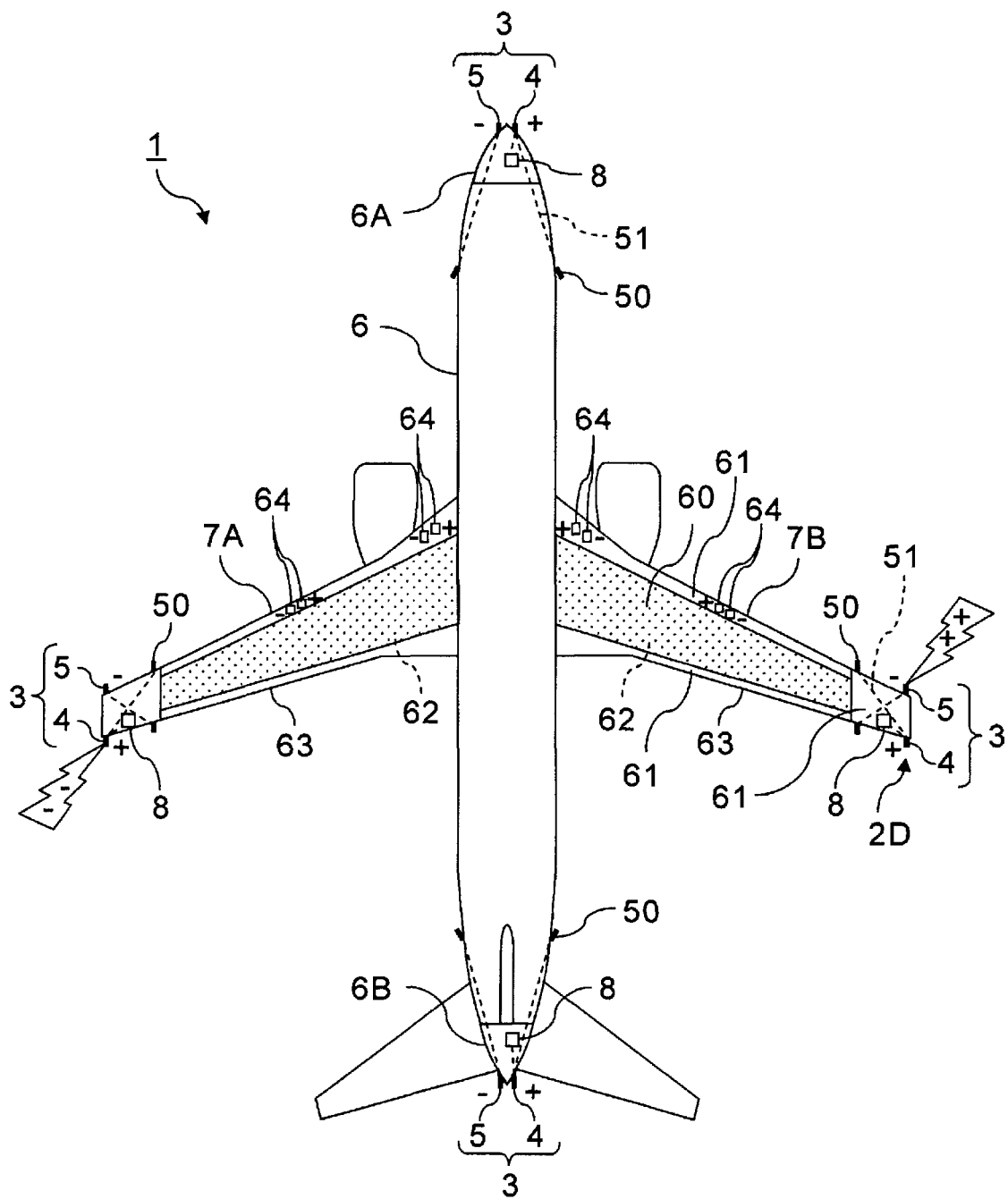
FIG. 9 is a top view of an example of an aircraft equipped with a lightning current controlling device according to an implementation of the technology.

FIG. 9 is a top view of an aircraft equipped with a lightning current controlling device according to a fifth implementation of the technology.

FIG. 9 illustrates a lightning current controlling device 2D of the fifth implementation. The lightning current controlling device 2D differs from the lightning current controlling device 2C of the fourth implementation in that a surface roughness of a component part of the aircraft 1 is adjusted to form a passing path into which a lightning current flows more easily. The other components and workings of the lightning current controlling device 2D of the fifth implementation do not substantially differ from those of the lightning current controlling device 2C of the fourth implementation, and therefore, the same components and the corresponding components are represented by the same reference signs, and descriptions thereof are not repeated.

Typically, it is more difficult for a lightning current to flow through an object with higher surface roughness. On the basis of this, surface roughness of the aircraft body of the aircraft 1 may be adjusted to cause a passing path of a lightning current to be controlled when the aircraft 1 is struck by lightning. For example, a surface of a component part having some probability that a lightning current flows therethrough may be sectioned into a rough surface region 60 having higher surface roughness and a smooth surface region 61 having lower surface roughness. Thus, a probability that a lightning current flows into the rough surface region 60 is lower than a probability that a lightning current flows into the smooth surface region 61.

A typical part of the aircraft 1 that should avoid being struck by lightning may include the fuel tank 62 as described above. In a case where the aircraft 1 is a typical fixed-wing aircraft, the fuel tank 62 may be provided to each of the left main wing 7A and the right main wing 7B, as illustrated in FIG. 9. The fuel tank 62 may be contained in each of the left main wing 7A and the right main wing 7B in one case or may be formed of each of the left main wing 7A and the right main wing 7B themselves in another case. That is, a casing of the fuel tank 62 may be protected by upper and lower panels 63 that are part of each of the left main wing 7A and the right main wing 7B in one case or may be formed of the upper and lower panels 63 themselves that are part of each of the left main wing 7A and the right main wing 7B in another case.

In view of this, outer surfaces of the upper and lower panels 63 of each of the left main wing 7A and the right main wing 7B in regions that protect or form the casings of the fuel tanks 62 may have higher surface roughness than the surface roughness of the outer surfaces of the panels 63 forming the wingtip of each of the left main wing 7A and the right main wing 7B. As necessary, the other part of the panel 63 may also have surface roughness higher than the surface roughness of the outer surfaces of the panels 63 forming the wingtip of each of the left main wing 7A and the right main wing 7B. In other words, a part of the panel 63 in the vicinity of the fuel tank 62, which protects or forms the casing of the fuel tank 62, may be made into the rough surface region 60 having relatively high surface roughness, whereas the other part of the panel 63 may be made into the smooth surface region 61 having relatively low surface roughness.

This decreases a probability that a lightning current generated by lightning that has struck any of the left main wing 7A and the right main wing 7B flows into a region, of the panel 63, that protects or forms the casing of the fuel tank 62. That is, causing the surface roughness of a region to be relatively higher than that of the other part makes it more difficult for a lightning current to flow in the region with the relatively high surface roughness.

In the example illustrated in FIG. 9, smooth surface regions 61 may be provided in regions, of the panel 63, forming a leading edge, a trailing edge, and a wingtip of each of the left main wing 7A and the right main wing 7B. Under these conditions, in a case where the wingtip of any of the left main wing 7A and the right main wing 7B having the first charged part 4 and the second charged part 5 is struck by lightning, a part into which a lightning current flows more easily is limited to the wingtip of the corresponding one of the left main wing 7A and the right main wing 7B. Also, in a case where the leading edge or the trailing edge of any of the left main wing 7A and the right main wing 7B is struck by lightning, a part into which a lightning current flows more easily is limited to the leading edge or the trailing edge of the corresponding one of the left main wing 7A and the right main wing 7B. That is, a passing path of a lightning current is limited to a part excluding the vicinity of the fuel tank 62 when lightning strikes any of the leading edge, the trailing edge, and the wingtip of any of the left main wing 7A and the right main wing 7B.

In some cases, the aircraft 1 may have a fuel tank that is contained in the fuselage 6 as in a small unmanned aircraft. In such cases, also, a casing of the fuel tank may be protected by a panel forming the fuselage 6 in one case and may be formed of the panel 63 forming the fuselage 6 in the other case. In view of this, as in the case of the fuel tanks 62 provided to the left main wing 7A and the right main wing 7B, surface roughness of the panel forming the fuselage 6 may be adjusted to enable limiting a part into which a lightning current flows more easily, to a part excluding the vicinity of the fuel tank.

A part of the aircraft 1 that should avoid being struck by lightning and inflow of a lightning current may include the fuel tank 62, a cabin, and a radome provided to a leading end of the fuselage or to any other part. It is necessary to maintain pressure in the cabin, and therefore, the cabin is a part that should avoid being damaged by lightning. Meanwhile, the radome may protect an antenna and may be high in price. Therefore, the radome is a part that should avoid being damaged by lightning. Thus, the cabin, the radome, and other parts may be sectioned into a region having higher surface roughness and a region having lower surface roughness to decrease a probability that a lightning current flows therethrough.

This may also apply to a case where the first charged part 4 and the second charged part 5 are not provided. That is, even in a case where the first charged part 4 and the second charged part 5 are not provided, lightning basically tends to strike the wingtips of the left main wing 7A and the right main wing 7B and the leading and trailing ends of the fuselage 6. For this reason, a passing path of a lightning current having either one of an entrance and an exit at a part which is struck by lightning more easily is limited to a specific passing path by adjusting surface roughness.

That is, a passing path of a lightning current is also controlled only by adjusting surface roughness of a component part of the aircraft 1. For example, locally increasing surface roughness of a component part decreases a possibility that a lightning current flows through the component part. In contrast, locally decreasing surface roughness of a component part increases a possibility that a lighting current flows through the component part.

In one example, instead of or in addition to the first charged part 4 and the second charged part 5, a capacitor 64 in which negative or positive electric charges are accumulated may be provided to form a part with a higher probability of being a lightning stroke point. In one example, in a case where surface roughnesses of the leading edges and the trailing edges of the left main wing 7A and the right main wing 7B are made smaller to facilitate flowing of a lightning current therethrough, as illustrated in FIG. 9, one or more capacitors 64 may be provided to the leading edges of the left main wing 7A and the right main wing 7B.

This relatively increases a probability that the leading edges of the left main wing 7A and the right main wing 7B are struck by lightning and relatively decreases a probability that the vicinity of the fuel tank 62 is struck by lightning. Thus, lightning is made to strike any of the leading edges and the wingtips of the left main wing 7A and the right main wing 7B as much as possible. Under these conditions, in a case where lightning strikes any of the leading edge and the wingtips of the left main wing 7A and the right main wing 7B, a region through which a lightning current flows is limited to the leading edge, the trailing edge, and the wingtips of the left main wing 7A and the right main wing 7B as much as possible.

The capacitor 64 may include a pair of capacitors 64, i.e., a capacitor 64 in which positive electric charges are accumulated and a capacitor 64 in which negative electric charges are accumulated. This increases the probability of being struck by lightning regardless of whether the lightning has a positive polarity or a negative polarity.

In a case where the protrusion 50 with the sharp shape is provided to each of the left main wing 7A and the right main wing 7B as in the case of the fourth implementation, the protrusions 50 may be coupled to the smooth surface regions 61 that are farther from the fuel tanks 62 in one example. This enables making the protrusion 50 serve as either one of an entrance and an exit of a lightning current that flows into the smooth surface region 61.

It goes without saying that the fifth implementation may be combined with one or more of the implementations of the technology in order to further prevent a lightning current from flowing into a part that should be avoided. That is, the thermal converter 40 may also be provided. Further, the first charged parts 4 may be mutually coupled by the conductor 9. Further, the second charged parts 5 may be mutually coupled by the conductor 9. Further, the first charged part 4 and the second charged part 5 may be coupled by the current path 10. Further, two or more of the thermal converter 40, the conductor 9, and the current path 10 may be used in combination. Thus, the probability that a lightning current flows into a part that should be avoided is further decreased.

Sixth Implementation

Figure 10:
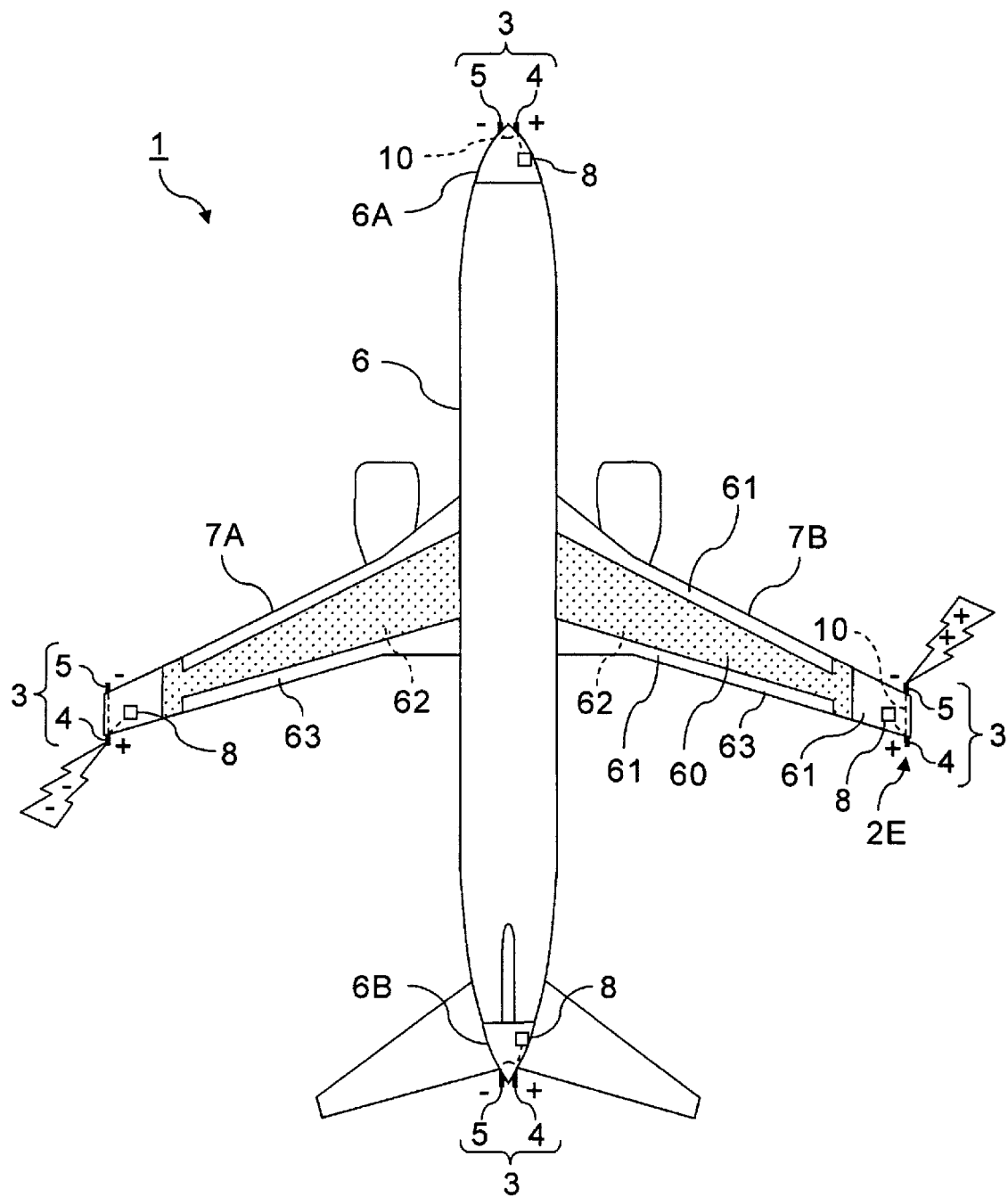
FIG. 10 is a top view of an example of an aircraft equipped with a lightning current controlling device according to an implementation of the technology.

FIG. 10 is a top view of an aircraft equipped with a lightning current controlling device according to a sixth implementation of the technology.

FIG. 10 illustrates a lightning current controlling device 2E of the sixth implementation. The lightning current controlling device 2E differs from the lightning current controlling device 2A of the second implementation in that surface roughness of a component part of the aircraft 1 is adjusted to form a passing path into which a lightning current flows more easily. The other components and workings of the lightning current controlling device 2E of the sixth implementation do not substantially differ from those of the lightning current controlling device 2A of the second implementation, and therefore, the same components and the corresponding components are represented by the same reference signs, and descriptions thereof are not repeated.

As described in the fifth implementation, adjusting surface roughness enables controlling the probability that a lightning current flows in. In view of this, in a case where the first charged part 4 and the second charged part 5 are coupled by the current path 10 to lead a lightning current to only the wingtips of the left main wing 7A and the right main wing 7B, as in the second implementation, surface roughness of an outer surface of a region, of the panel 63, between the region, of the panel 63, forming the wingtip and the region, of the panel 63, protecting or forming the casing of the fuel tank 62 in each of the left main wing 7A and the right main wing 7B may be made higher than the surface roughness of the outer surface of the region, of the panel 63, forming the wingtip of each of the left main wing 7A and the right main wing 7B.

That is, while the region, of the panel 63, forming the wingtip of each of the left main wing 7A and the right main wing 7B may be made to have the smooth surface region 61, the region, of the panel 63, between the region, of the panel 63, forming the wingtip and the region, of the panel 63, protecting or forming the casing of the fuel tank 62 in each of the left main wing 7A and the right main wing 7B, and the region, of the panel 63, protecting or forming the casing of the fuel tank 62, may be made to have the rough surface region 60. As necessary, any other region of the panel 63 may also be made to have the rough surface region 60.

This enables decreasing a possibility that a lightning current flows into the region, of the panel 63, that protects or forms the casing of the fuel tank 62 in a case where the lightning current flows into the smooth surface region 61, of the panel 63, that forms the wingtip of each of the left main wing 7A and the right main wing 7B.

It goes without saying that the sixth implementation may be combined with one or more of other implementations of the technology in order to further prevent a lightning current from flowing into a part that should be avoided. That is, any of the thermal converter 40 and the protrusion 50 may also be provided. Further, the first charged parts 4 may be mutually coupled by the conductor 9. Further the second charged parts 5 may be mutually coupled by the conductor 9. Further, two or more of the thermal converter 40, the protrusion 50, and the conductor 9 may be used in combination. Thus, the probability that a lightning current will flows into a part that should be avoided is further decreased.

Other Implementations

Although some implementations of the technology have been described in the foregoing by way of example with reference to the accompanying drawings, the technology is by no means limited to the implementations described above. The novel methods and devices described herein are allowed to be embodied by various other implementations. It should be appreciated that omissions, replacements, modifications, and alterations may be made by persons skilled in the art in various ways without departing from the scope as defined by the appended claims. The technology is intended to include such omissions, replacements, modifications, and alterations in so far as they fall within the scope of the appended claims or the equivalents thereof.

For example, the above implementations of the technology may be used in combination, or the components, the structures, and the features in each of the above implementations of the technology may be partially omitted. Any of the above implementations of the technology provides a lightning current controlling method and a lightning current controlling device, by each of which a passing path of a lightning current is controlled when the aircraft 1 is struck by lightning. The lightning current controlling method and the lightning current controlling device perform adjusting surface roughness of the surface of the aircraft body of the aircraft 1, a charged amount of the surface of the aircraft body of the aircraft 1, or both. Furthermore, any of the above implementations of the technology provides the aircraft 1 having surface roughness of the surface of the aircraft body, charged amount of the surface of the aircraft body, or both that are adjusted to cause a passing path of a lightning current to be controlled when the aircraft 1 is struck by lightning.

The invention claimed is:

1. A lightning current controlling device comprising:
a first charged part that is configured to be provided to an aircraft and to be positively charged to have a higher probability of being a location struck by negative lightning, wherein the first charged part includes a first dielectric that tends to be positively charged, the first dielectric is exposed to an outside of the aircraft; and
a second charged part that is configured to be provided to the aircraft and to be negatively charged to have a higher probability of being a location struck by positive lightning, wherein the second charged part includes a second dielectric that tends to be negatively charged, the second dielectric is exposed to the outside of the aircraft.

2. The lightning current controlling device according to claim 1, wherein each of the first dielectric and the second dielectric include a protrusion.

3. The lightning current controlling device according to claim 2, wherein:
the first dielectric includes polyamide resin, rayon, or both, and the second dielectric includes polytetrafluoroethylene, acrylic resin, or both.

4. The lightning current controlling device according to claim 3, further comprising an electrostatic generator that is configured to positively charge the first dielectric.

5. The lightning current controlling device according to claim 4, further comprising:
multiple lightning stroke controllers each including the first charged part and the second charged part;
a first conductor that mutually couples the first dielectrics of the respective lightning stroke controllers; and
a second conductor that mutually couples the second dielectrics of the respective lightning stroke controllers.

6. The lightning current controlling device according to claim 1, further comprising an electrostatic generator that is configured to positively charge the first dielectric.

7. The lightning current controlling device according to claim 1, wherein the second dielectric is configured to be negatively charged by friction with air.

8. The lightning current controlling device according to claim 1, wherein the second dielectric includes polytetrafluoroethylene, acrylic resin, or both.

9. The lightning current controlling device according to claim 1, wherein the first dielectric includes polyamide resin, rayon, or both.

10. The lightning current controlling device according to claim 1, further comprising:
multiple lightning stroke controllers each including the first charged part and the second charged part, the lightning stroke controllers being configured to be disposed at a leading end and a trailing end of a fuselage of the aircraft;
a first conductor that mutually couples the first dielectrics of the respective lightning stroke controllers; and
a second conductor that mutually couples the second dielectrics of the respective lightning stroke controllers.

11. The lightning current controlling device according to claim 1, further comprising multiple lightning stroke controllers each including the first charged part and the second charged part, the lightning stroke controllers being configured to be disposed at wingtips of respective right and left main wings of the aircraft;
- a first conductor that mutually couples the first dielectrics of the respective lightning stroke controllers; and
- a second conductor that mutually couples the second dielectrics of the respective lightning stroke controllers.

12. The lightning current controlling device according to claim 1, further comprising a current path configured to couple the first charged part and the second charged part with each other, the current path being configured to maintain a potential difference between the first charged part and the second charged part and to allow a lightning current generated by lightning that has struck either one of the first charged part and the second charged part to flow into the current path.

13. The lightning current controlling device according to claim 1, further comprising a thermal converter that includes one or multiple conductors coupled to the first charged part and the second charged part, the thermal converter being configured to convert, with the one of multiple conductors, energy of a lightning current generated by lightning that has struck either one of the first charged part and the second charged part, into thermal energy to prevent the lightning current from flowing.

14. The lightning current controlling device according to claim 1, further comprising:
- a first conductor coupled to the first charged part;
- a second conductor coupled to the second charged part;
- a first protrusion configured to provide the first conductor with either one of an entrance and an exit of a lightning current that is generated by lightning that has struck the first charged part; and
- a second protrusion configured to provide the second conductor with either one of an entrance and an exit of a lightning current that is generated by lightning that has struck the second charged part.

15. An aircraft comprising the lightning current controlling device according to claim 1.

16. The aircraft according to claim 15, wherein at least surface roughness of an outer surface of a first region of a panel is made higher than surface roughness of an outer surface of a second region of the panel, to decrease a probability that a lightning current generated by lightning that has struck the aircraft flows into the first region, the first region protecting or forming a casing of a fuel tank, the second region forming a wingtip.

17. The aircraft according to claim 16, wherein surface roughness of an outer surface of a region, of the panel, between the first region and the second region of the panel is made higher than the surface roughness of the outer surface of the second region of the panel, to decrease a probability that a lightning current flows into the first region of the panel, when the lighting current flows into the second region of the panel.

* * * * *